(12) United States Patent
Xu et al.

(10) Patent No.: US 9,525,461 B2
(45) Date of Patent: Dec. 20, 2016

(54) SUPPRESSION METHOD FOR STRONG INTERFERENCE NOISE OF CARRIER CHANNEL OF POWER LINE AND CIRCUIT STRUCTURE THEREOF

(71) Applicant: Zhongyi Xu, Shenzhen (CN)

(72) Inventors: Zhongyi Xu, Shenzhen (CN); Haibo Xu, Guang-dong (CN)

(73) Assignee: Zhongyi Xu, Shenzhen (CN)

( * ) Notice: Subject to any disclaimer, the term of this patent is extended or adjusted under 35 U.S.C. 154(b) by 0 days.

(21) Appl. No.: 14/443,636

(22) PCT Filed: Jul. 18, 2013

(86) PCT No.: PCT/CN2013/079599
§ 371 (c)(1),
(2) Date: May 18, 2015

(87) PCT Pub. No.: WO2014/190596
PCT Pub. Date: Dec. 4, 2014

(65) Prior Publication Data
US 2016/0072550 A1 Mar. 10, 2016

(30) Foreign Application Priority Data
May 28, 2013 (CN) .......................... 2013 1 0203457

(51) Int. Cl.
*H04B 15/00* (2006.01)
*H04B 3/54* (2006.01)

(52) U.S. Cl.
CPC ................ *H04B 3/54* (2013.01); *H04B 15/00* (2013.01); *H04B 2203/5425* (2013.01)

(58) Field of Classification Search
CPC .... H04B 3/54; H04B 15/00; H04B 2203/5425
See application file for complete search history.

(56) References Cited

U.S. PATENT DOCUMENTS

| | | | | |
|---|---|---|---|---|
| 2,138,341 A | * | 11/1938 | Crosby .................... | H03D 5/00 329/327 |
| 2,367,947 A | * | 1/1945 | Kenefake ................. | H04B 3/54 455/63.1 |

(Continued)

FOREIGN PATENT DOCUMENTS

| | | |
|---|---|---|
| CN | 101621312 A | 1/2010 |
| CN | 202085136 U | 12/2011 |
| JP | H07123033 A | 5/1995 |

OTHER PUBLICATIONS

International Search Report of PCT/CN2013/079599 dated Mar. 13, 2014.

(Continued)

*Primary Examiner* — Jean B Corrielus
(74) *Attorney, Agent, or Firm* — Knobbe Martens Olson & Bear LLP

(57) ABSTRACT

A suppression method for strong interference noise of power line carrier channel is based on the processing process to carrier signals transmitted in standardized frequency interval among power line transmission regional area. According to the situation of frequency lead or lagging carrier of strong interference noise, the pending signals are respectively transmitted to a first suppression circuit (3) of which the frequency of strong interference noise signal is lower than the frequency of carrier signal, and a second suppression circuit (5) of which the frequency of strong interference noise signal is higher than the frequency of carrier signal through split-flow processing channel module to process the amplitude limiting signal, and then output signals of the first suppression circuit (3) and second suppression circuit (5) are conducted with differential mixing and output to complete the noise reduction process. Regardless of any position of strong interference noise and carrier in channel, the suppression of strong interference noise of power line can be (Continued)

realized by this method. In the major premise of the weak carrier signal not being suppressed, this method has realized that the strong interference noise is effectively attenuated.

4 Claims, 5 Drawing Sheets

(56) References Cited

U.S. PATENT DOCUMENTS

| | | | | |
|---|---|---|---|---|
| 2,632,101 | A | * | 3/1953 | Quarles .................... H04B 1/12 455/102 |
| 6,108,328 | A | * | 8/2000 | Ranta ........................ H04L 5/02 370/345 |
| 2003/0002590 | A1 | | 1/2003 | Kaku et al. |

OTHER PUBLICATIONS

Written Opinion of the International Search Authority of PCT/CN2013/079599 dated Mar. 13, 2014.

* cited by examiner

SUPPRESSION METHOD FOR STRONG INTERFERENCE NOISE OF CARRIER CHANNEL OF POWER LINE AND CIRCUIT STRUCTURE THEREOF

RELATED APPLICATIONS

The instant application is the U.S. National Phase under 35 U.S.C. §371 of International Application No. PCT/CN2013/079599 entitled SUPPRESSION METHOD FOR STRONG INTERFERENCE NOISE OF CARRIER CHANNEL OF POWER LINE AND CIRCUIT STRUCTURE THEREOF, filed Jul. 18, 2013, designating the U.S.; which claims priority to Chinese Patent Application No. 201310203457.8, filed May 28, 2013, now Chinese Patent No. CN103338080. The contents of these related applications are herein expressly incorporated by reference in their entireties.

FIELD OF THE INVENTION

This invention belongs to the technology field of power line carrier communication, which relates to a suppression method for interfering noise in the process of communication by utilizing the power line carrier channel, specifically the suppression method for strong interference noise of power line carrier channel and its circuit structure.

BACKGROUND OF THE INVENTION

The transmission of carrier signal in power line transporting electric energy has the problem of seriously mismatched impedance. Therefore, it is impossible to design larger output power of carrier communication equipment, and the carrier signal power actually transmitted in power line is very weak. The interference noise and pulse in power line come from high-power electric equipments in power line distribution network, and these equipments are randomly "on" or "off" through high-voltage switches. Therefore, the power is very high. The power difference of these two strong and weak signals can reach up to over 50 dB. Even though the mixed superposition of two signals in power line is based on strong interference noise on indicators of frequency and amplitude, the weak carrier signal can slightly change the amplitude of strong interference noise through superposition. However, it will be a very difficult job to directly separate and measure it through dedicated circuits or instruments. Although the strongly interfered carrier signal actually transmitted in power line is very complicated, and is impossible to be predicted or difficult to be specifically described with a stable signal, in consideration of principle that any complicated signal can be decomposed into a variety of sine wave signals with different frequencies and different amplitudes according to Fourier transformation, we can simplify the carrier signal actually transmitted in power line and damaged by strong interference noise or pulse into the superposition of two lists of sine wave signals with amplitude difference of 50 dB and different frequencies. After the superposition, the signal frequency and amplitude are based on strong sine wave signals, and the weak sine wave signals add their own information through slightly changing the amplitudes of strong sine waves by superposition. The following description of two waveforms of superposition can be equivalent to waveforms of all carrier signals damaged by strong interference noise in power line.

The first superposition waveform appears when the strong sine wave frequency is lower than weak sine wave frequency, which can be described as: in a period of strong sine wave, its amplitude slightly changes with the amplitude change of weak sine wave in various periods. The weak change of this strong sine wave amplitude carries the information of weak sine wave signal.

The second superposition waveform appears when the strong sine wave frequency is higher than weak sine wave frequency, which can be described as: the strong sine wave amplitudes of various periods slightly change within a weak signal period, carrying the information of weak sine wave signal through this change. We can easily see the description of waveforms of these two signals, which although come from the same principle of waveform superposition, however the waveform structures are essentially different. If we design a suppression sine wave circuit, which can effectively suppress the strong sine wave signal of which the frequency is lower than weak sine wave, and improve the weak sine wave signal with higher frequency. However, when swapping frequencies of strong and weak sine waveforms, the strong sine wave signal is improved and enhanced on the contrary, and the weak sine wave signal is suppressed, thereby getting the opposite results. Thus, the above noise suppression method has strict prerequisite conditions.

Therefore, the mutual frequency range of strong and weak sine waves in channel shall be effectively, accurately, and randomly distinguished and completed with time-sharing processing. The strong and weak represent the interference noise and communication signal, so as to effectively suppress the strong sine wave signal in the whole channel, which is the key on improving the signal to noise ratio.

As mentioned above, due to the amplitude difference of both strong and weak sine waves of 50 dB, the frequencies of strong and weak sine waves shall be determined in advantage for distinguishment of mutual frequency scope, and then the noise suppression method shall be selected, which can't be achieved in circuit design of existing technology. Therefore, another more practical and effective mode shall be found to distinguish randomly changed noise frequencies and automatically transmit them to applicable processing channels. This is the technical problem that needs to be resolved by this invention.

SUMMARY OF THE INVENTION

In order to solve the above technical problem, a suppression method for strong interference noise of power line carrier channel and its circuit structure is designed in this invention. This method is based on the frequency scope of strong interference noise and carrier in carrier channel, distributes and transmits the interfered carrier signal into corresponding matched noise suppression circuit, so as to conduct the extraction and enhancement of strong interference noise suppression and weak carrier signal, thereby effectively realizing the strong interference noise suppression in power line carrier channel.

A suppression method for strong interference noise of power line carrier channel, is based on the processing to carrier signals transmitted in standardized frequency interval among power line transmission regional area, steps of the method comprise:

A. The carrier signal extracted from the receiving point is introduced into the high-pass filter, eliminating the interference signal within lower limit of frequency interval mixed in carrier signal, so as to obtain the mixed signal higher than lower limiting value of frequency interval, which mixes strong interference noise signal and carrier signal;

B. The mixed signal is conducted with amplitude limiting through a nominal level amplitude limiting circuit, so as to obtain the mixed amplitude limiting signal within nominal level range;

C. The mixed amplitude limiting signal is introduced into a time-sharing processing channel module, which includes a comparison circuit of frequency of strong interference noise signal and carrier signal, and two exits of information channel determined by logic value of comparison circuit: channel exit 2A, of which the frequency of strong interference noise signal is lower than the frequency of carrier signal, and channel exit 2B, of which the frequency of strong interference noise signal is higher than the frequency of carrier signal, thereby entering into time-sharing processing;

D. The mixed signal, of which the frequency of strong interference noise signal is lower than the frequency of carrier signal, is introduced into first suppression circuit for processing of amplitude limiting and noise reduction to get the mixed signal A, which is then transmitted to differential mixed circuit;

E. The mixed signal, of which the frequency of strong interference noise signal is higher than the frequency of carrier signal, is introduced into second suppression circuit for processing to get the mixed signal B after noise suppression, which is then transmitted to differential mixed circuit;

F. Two signals A and B are conducted with differential mixing through the differential mixer;

G. The signal is output after differential mixing to complete the process of noise suppression.

The beneficial effects of this invention are: 1. Regardless of any random change in power line carrier channel, the frequencies of strong interference noise and carrier (sub-carrier) can be accurately distinguished, and the carrier (sub-carrier) signal damaged by strong interference noise can be transmitted to corresponding processing circuit for suppression; in the major premise of whole carrier frequency band not being suppressed, the weak carrier (sub-carrier) signal can effectively attenuate the strong interference noise, that is, the frequencies of strong interference noise and weak carrier are not necessary for measurement, the frequency of strong interference noise is higher or lower than carrier frequency can be accurately distinguished through specifically distinguishing the level output of circuit, thereby precisely guiding the carrier signal damaged by strong interference noise to corresponding suppression circuit, so as to effectively suppressing the strong noise interference; 2. The frequency scope of power line carrier channel regulated by China is: from 40 khz to 500 khz, therefore, any strong interference noise suppression circuit designed by this invention method satisfies conditions of normal work in this frequency band; 3. For any mixed signal with difference of 50 dB, it is based on suppression of strong interference signal, however, the weak signal can't be compressed and attenuated. The design difficulty can be imagined to distinguish or screen out the weak carrier signal from noise inundation with amplitude of 50 dB by "simulative" or "digital" processing technology. This invention method first starts from distinguishing, recognizing, and suppressing the strong interference noise signal, although the weak carrier signal can't be caught, however the carrier (sub-carrier) absolutely won't be weakened or compressed. When the strong noise interference is suppressed to certain level, the carrier signal will be extracted for effective amplification, thereby improving the signal to noise ratio of transmission carrier (sub-carrier) signal in channel.

Figure 1:
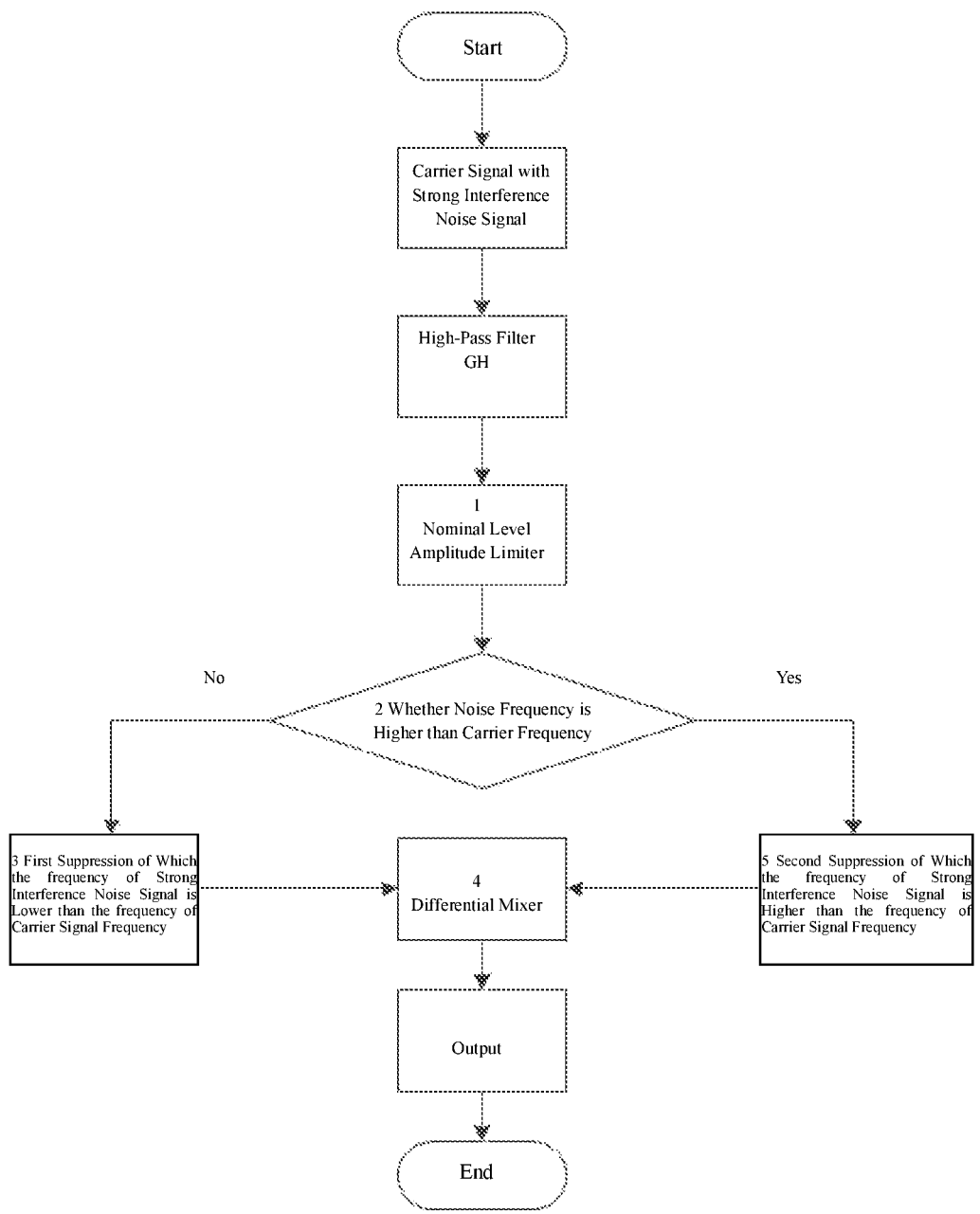
FIG. 1 is the flow chart of this invention.

In the drawings, 1 is the nominal level amplitude limiting circuit, 2 is the time-sharing processing channel module; 2A is the channel exit of which the frequency of strong interference noise signal is lower than the frequency of carrier signal, 2B is the channel exit of which the frequency of strong interference noise signal is higher than the frequency of carrier signal, 3 is the first suppression circuit, 4 is the differential mixer, 5 is the second suppression circuit, GH is the high-pass filter, 7 represents the delay comparison amplifier circuit, 8 represents the comparison circuit, 9 is the first level switching circuit, 10 is the noise level extraction circuit, 11 is the second level switching circuit, 12 is the non-gate circuit, 13 is the first electronic switch, 14 is the second electronic switch, 15 is the third electronic switch, 16 is the control signal extraction circuit, 17 is the delayer circuit, 19 is the controlled comparison amplifier circuit, 23 is the second emitter follower circuit, 27 is the limiter circuit, 28 is the fifth emitter follower circuit, and 29 is the fourth emitter follower circuit, 30 is the differential amplifier circuit, 31 represents the setting noise level comparison circuit, 32 is the controlled switch circuit K1, 33 represents the control logic generation circuit, 34 is the controlled switch circuit K2, 35 is the third matching emitter follower, 48 is the input end emitter follower circuit, 49 is the nominal level amplifying circuit, 50 is the noise detection comparison amplifying circuit, 51 is the controlled attenuator circuit, 52 is the first emitter follower circuit, T is the control signal extraction circuit, J is the noise frequency discrimination circuit, L represents the trigger logic circuit.

DETAILED DESCRIPTION OF THE INVENTION

A suppression method for strong interference noise of power line carrier channel is based on the processing process to carrier signals transmitted in standardized frequency interval among power line transmission regional area, which is important in that: steps of the method described by FIG. 1, comprise:

A. The carrier signal extracted from the receiving point is introduced into the high-pass filter (GH), eliminating the interference signal within lower limit of frequency interval mixed in carrier signal, so as to obtain the mixed signal higher than lower limiting value of frequency interval, which mixes strong interference noise signal and carrier signal;

B. The mixed signal is conducted with amplitude limiting through a nominal level amplitude limiting circuit 1, so as to obtain the mixed amplitude limiting signal within nominal level range;

C. The mixed amplitude limiting signal is introduced into a time-sharing processing channel module 2, which includes a comparison circuit of frequency of strong interference noise signal and carrier signal, and two exits of information channel determined by logic value of comparison circuit: channel exit 2A, of which the frequency of strong interference noise signal is lower than the frequency of carrier signal, and channel exit 2B, of which the frequency of strong interference noise signal is higher than the frequency of carrier signal, thereby entering into time-sharing processing;

D. The mixed signal, of which the frequency of strong interference noise signal is lower than the frequency of carrier signal, is introduced into first suppression circuit 3 for processing of amplitude limiting and noise reduction to get the mixed signal A, which is then transmitted to differential mixed circuit 4;

E. The mixed signal, of which the frequency of strong interference noise signal is higher than the frequency of carrier signal, is introduced into second suppression circuit 5 for processing to get the mixed signal B after noise suppression, which is then transmitted to differential mixed circuit 4;

F. Two signals A and B are conducted with differential mixing through the differential mixer 4;

G. The signal is output after differential mixing to complete the process of noise suppression.

Figure 2:
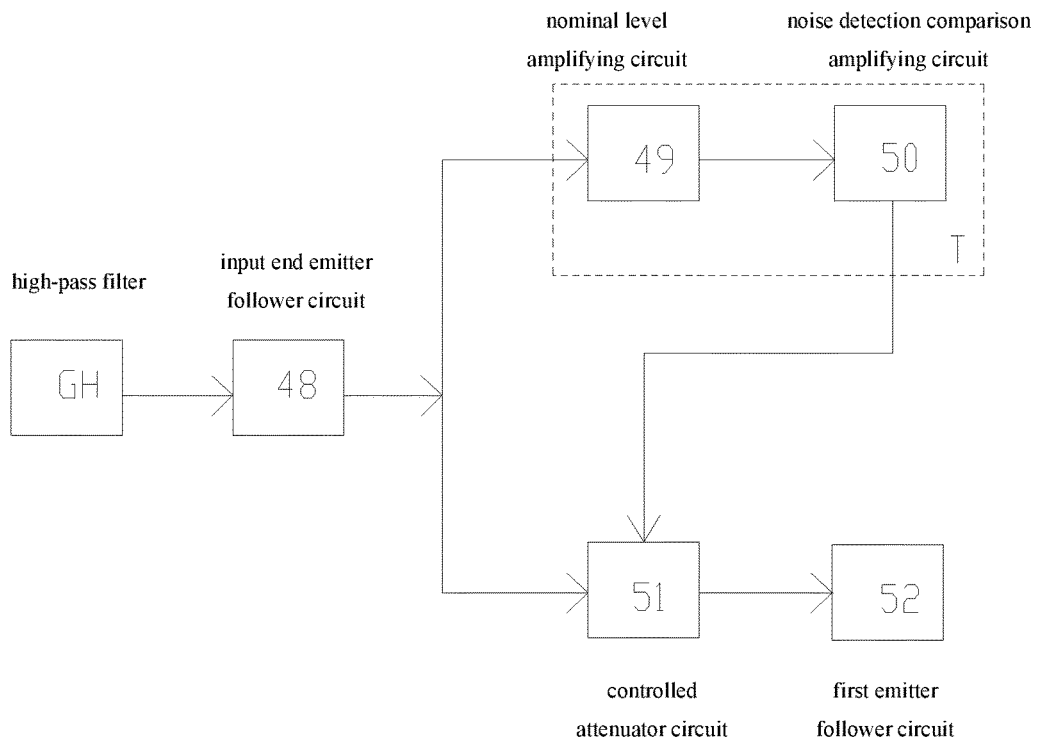
FIG. 2 is the structure schematic diagram of nominal level amplitude limiting circuit.

The structure of nominal level amplitude limiting circuit 1 mentioned in step B of this method, which is shown as FIG. 2, includes an input end emitter follower circuit 48, a nominal level amplifying circuit 49, a noise detection comparison amplifying circuit 50, a controlled attenuator circuit 51. After entering into the emitter follower circuit 48 for impedance matching, the mixed signal passing through the high-pass filter GH is sent to the controlled attenuator circuit 51, the control signal of controlled attenuator circuit 51 comes from control signal extraction circuit T, the control signal extraction circuit T consists of the series nominal level amplifying circuit 49 and noise detection comparison amplifying circuit 50, and the output of controlled attenuator circuit 51 is sent to next step for processing via a first emitter follower circuit 52. Because the pulse interference in power line carrier channel is very powerful, and the dynamic range can reach up to dozens of decibels. The general electronic circuit hardly satisfies the requirements of dynamic range of this interfered carrier signal, therefore the "nominal level amplitude limiting circuit 1" is designed, which can conduct the amplitude limitation to signal if the nominal level is exceeded. The functions of nominal level amplitude limiting circuit 1 can ensure that when the strong interference is lower than nominal level, the amplitude of carrier signal can be prevent from being damaged, when the strong interference is higher than nominal level, the carrier signal will be compressed in proportion. The function of input end emitter follower circuit 48 is to conduct the impedance matching, the nominal level amplifying circuit 49 is to be convenient for detecting the information extraction of noise comparison amplifying circuit 50 to interference noise level fluctuation, and control the controlled attenuator circuit 51 with extracted information, thereby making it conduct attenuation to signal higher than the set amplitude. The first emitter follower circuit 52 is easy to be matched with next port.

Figure 4:
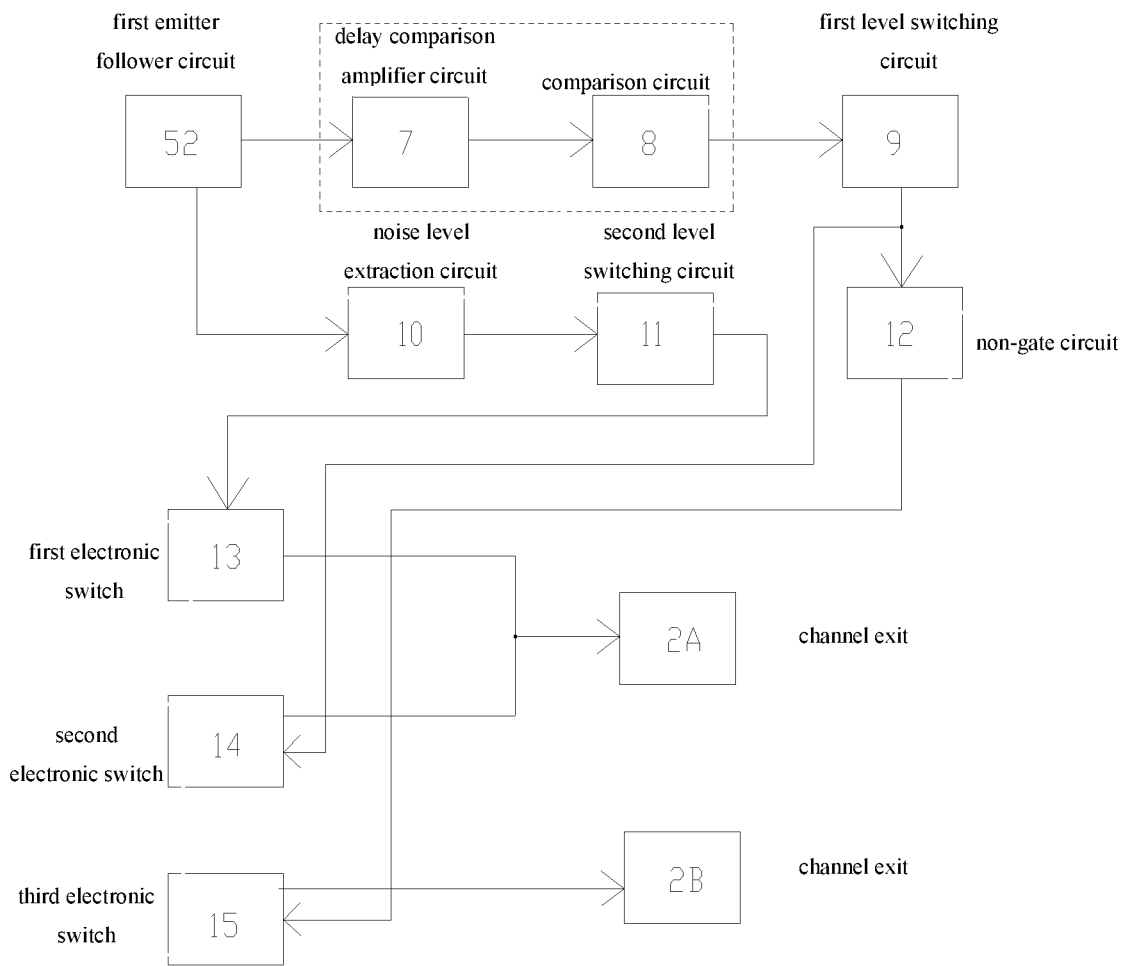
FIG. 4 is the structure schematic diagram of time-sharing processing channel module.

The structure of the time-sharing processing channel module 2 of step C, which is shown as FIG. 4, includes: a noise frequency discrimination circuit J and noise level extraction circuit 10 are connected in parallel with the first emitter follower 52, the signals are converted into trigger signals through a first level switching circuit 9, a second level switching circuit 11, and a non-gate circuit (12), and then sent to a first electronic switch 13, a second electronic switch 14, and a third electronic switch 15, those circuits compose channel exit 2A, of which the frequency of strong interference noise signal is lower than the frequency of carrier signal, and channel exit 2B, of which the frequency of strong interference noise signal is higher than the frequency of carrier signal of time-sharing processing channel module 2. The function of the time-sharing processing channel module 2 is very important, which can randomly and accurately distinguish the strong interference noise, pulse, or other interference wave and carrier (sub-carrier) frequency, and size relationship in carrier channel, thereby transmitting the interfered carrier (sub-carrier) at this time to corresponding noise suppression circuit for processing.

The structure of noise frequency discrimination circuit J includes a delay comparison amplifier circuit 7 and a series circuit of comparison circuit 8. The time-sharing processing channel module 2 is the recognition circuit for recognizing whether the strong interference noise frequency is lower or higher than carrier (sub-carrier) frequency, the comparison circuit 8 is the comparison circuit, which can make the output of delay comparison amplifier 7 turn when reaching or exceeding the set level, thereby adjusting the control sensitivity of damaged carrier (sub-carrier) signal transmitted to corresponding noise suppression circuit when the interference noise is higher than carrier frequency through setting different levels of comparator. The first level switching circuit 9 can switch the output of comparator into control pulse. As long as the strong interference appears in channel, the noise level extraction circuit 10 will have output. When there's no strong interference noise in random channel, because the second suppression circuit contains the direct circuit of carrier signal without interference, the noise level extraction circuit 10 will give real-time carrier signal to it of which the strong interference noise signal frequency is higher than carrier signal frequency through control logic. The function of second level switching circuit 11 is same with the first level switching circuit 9. The first level switching circuit 9, second level switching circuit 11, and non-gate circuit 12 combine the logic control first electronic switch 13, second electronic switch 14, and third electronic switch 15, so as to realize the distribution and transmission of interfered carrier signal to corresponding suppression circuit according to mutual positions of strong interference and carrier (sub-carrier) frequencies in carrier channel, thereby suppressing the strong interference and extracting and enhancing the weak signal.

The first suppression circuit 3 of which the frequency of strong interference noise signal is lower than the frequency of carrier signal, and the second suppression circuit 5 of which the frequency of strong interference noise signal is higher than the frequency of carrier signal separately receive interfered carrier signal transmitted from the time-sharing processing channel module 2 for suppression to strong interference and enhancement and extraction of weak carrier signal. Because the outputs of the first suppression circuit 3 and the second suppression circuit 5 are alternately conducted, which have no time conflict, therefore, the continuous signals in time can be composed by differential mixture 4. Wherein:

The structure of first suppression circuit 3 described in step D includes a delayer circuit 17, a controlled comparison amplifier circuit 19, a second emitter follower circuit 23. The mixed signal from channel exit 2A and signal conducted with delayed processing via the delayer circuit 17 are sent to the controlled comparison amplifier circuit 19 for differential amplification, which are then sent to the next step for processing via the second emitter follower circuit 23.

The structure of second suppression circuit 5 described by step E includes: two information channels designed for mixed signal from the channel exit 2B, a third matching emitter follower 35 connecting to next step by a series controlled switch circuit K1 32 and a controlled switch circuit K2 in each information channel, a limiter circuit 27 and a differential amplifier circuit 30 are in series connection in information channel of the controlled switch circuit K1, the input port of the differential amplifier circuit 30 is connected with another information channel; the structure of second suppression circuit 5 also includes a trigger logic circuit L of the controlled switch circuit K1 and controlled switch circuit K2, the control signal of this trigger logic circuit L is comprised by setting noise level comparison circuit 31 and control logic generation circuit 33, which is respectively loaded on trigger ends of controlled switch circuit K1 and controlled switch circuit K2.

The circuit structure of setting noise level comparison circuit 31 include an amplifier U51B, a diode D51, and peripheral matched elements of resistor and capacitor, the output end of amplifier U51B is connected with the cathode of diode D51.

The circuit structure of control logic generation circuit 33 includes a NAND U52A and a NAND gate U52B, the output end and ground terminal of setting noise level comparison circuit 31 are respectively connected with input end of NAND gate U52A, connected with output end of NAND gate U52A, control end of controlled switch circuit K1 and input end of NAND gate U52B, as well as connected with output end of NAND gate U52B and trigger end of controlled switch circuit K2.

Figure 6:
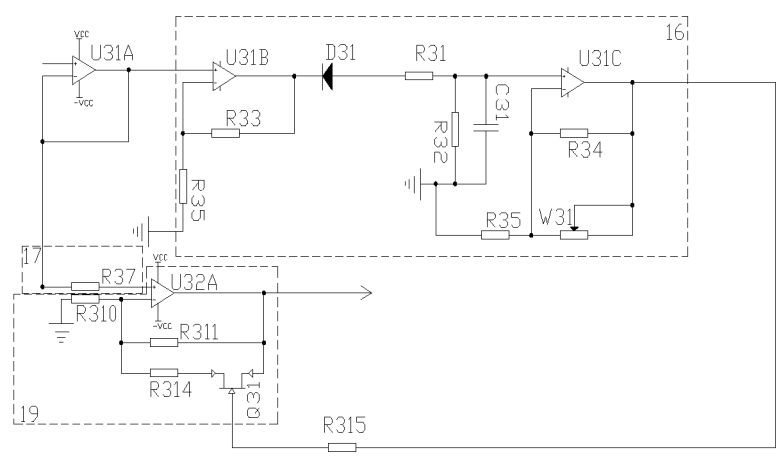
FIG. 6 is the electrical schematic diagram of another embodiment of the first suppression circuit, of which the strong interference noise signal frequency is lower than the carrier signal frequency.

The structure of first suppression circuit 3 includes a delayer circuit 17, a controlled comparison amplifier circuit 19, a matching second emitter follower circuit 23, and a control signal extraction circuit 16. The mixed noise signal passes through the channel exit 2A, after being conducted with delay processing via the delayer circuit 17, the signal is sent to the controlled comparison amplifier circuit 19 for differential amplification, which is output via the matching second emitter follower circuit 23. The control signal is sent out from the control signal extraction circuit 16 to control signal input end of amplification factor control circuit in the controlled comparison amplifier circuit 19. In preferred embodiments, the delayer circuit 17 described by FIG. 6 is the resistor R37; the controlled comparison amplifier circuit 19 is operational amplifier U32A and matched elements of resistor R310 and resistor R37, which is lapped by controlled amplification factor regulating circuit formed in parallel and in series of resistor R311, resistor R314 and field-effect transistor Q31 between the output and input of operational amplifier U32A. The operational amplifier U32A is directly output and transferred to second-level noise suppression processing circuit. The second-level noise suppression processing circuit has same principle with the first suppression circuit 3.

The structure of control signal extraction circuit 16 includes an AC amplifying circuit linked by operational amplifier U31B and peripheral matched resistor R31 and resistor R33, a DC channel constituted by elements of diode D31, detecting and filtering resistor R31, resistor R32, and capacitor C13, a DC amplifying circuit constituted by operational amplifier U31C and peripheral matched resistor R31 and resistor R33, the above circuits are successively connected in series to form the amplifying circuit, diode D31 and peripheral matched resistor and capacitor elements linked by adjustable resistor W31. The mixed noise signal is connected with input end of amplifier U31B via the channel exit 2A.

Figure 8:
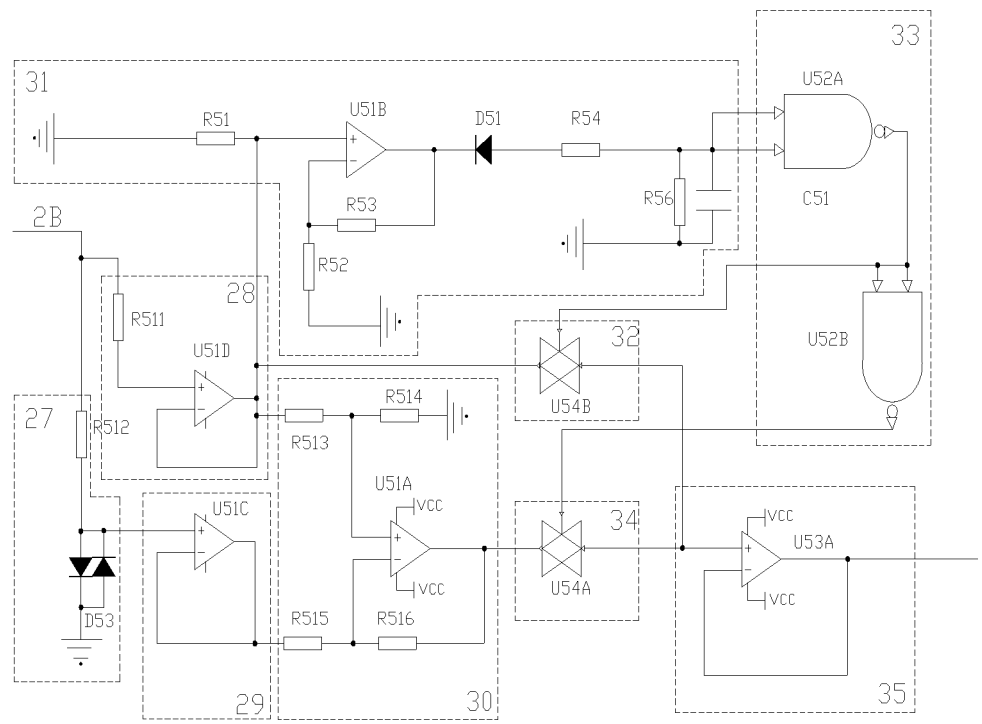
FIG. 8 is the electrical schematic diagram of second suppression circuit, of which the frequency of strong interference noise signal is higher than the frequency of carrier signal.

The structure of second suppression circuit 5 includes: two information channels are designed in this circuit for incoming mixed noise signal, the first channel is the direct connection channel, which is comprised by a fifth emitter follower circuit 28, a controlled switch circuit K2 34, a third matched emitter follower 35; the second channel is the noise suppression processing channel, which is comprised by a limiter circuit 27, a fourth emitter follower circuit 29, a differential amplifier circuit 30, and a controlled switch circuit K1; two input ends of the differential amplifier circuit 30 are respectively connected to output ends of the fifth emitter follower circuit 28 and the fourth emitter follower circuit 29, the exit end is connected to input port of the third matched emitter follower 35 through the controlled switch circuit K1 for adaption processing and output; the structure of this circuit also includes the control signal extraction circuit, which is formed by connection of the setting noise level comparison circuit 31 and control logic generation circuit 33 in series, connecting with the output port of the fifth emitter follower circuit 28. Two trigger signal lines led from the control logic generation circuit 33 are respectively connected with trigger ports of two controlled switches. The specific embodiments is shown as FIG. 8, the fifth emitter follower circuit 28 in direct connection channel is lapped by operation amplifier U51D and resistor R511, the controlled switch circuit K1 is the electronic switch U54A, the third matched emitter follower 35 is the operational amplifier U53A; the amplitude limiter circuit 27 in second channel is the voltage division circuit comprised by resistor R512 and bilateral diode D53, the fourth emitter follower circuit 29 is lapped by operational amplifier U51C, the differential amplifier circuit 30 is the comparison amplifying circuit lapped by operational amplifier U51A and elements of resistor R513, resistor R514, resistor R515, and resistor R516, the controlled switch circuit K2 is the electronic switch U54B, two input ports of operation amplifier U51A are respectively connected with operational amplifier U51D by resistor R513 and resistor R515, output end of operational amplifier U51C, and exit end is connected with input port of operational amplifier U53A through electronic switch U54A.

The setting noise level comparison circuit 31 is connected in series by differential amplifier lapped by operational amplifier U51B and matched elements of resistor R51, resistor R52, and resistor R53 and detecting and filtering circuits comprised by diode D51 and elements of resistor R54, resistor R56, capacitor C51. The input end of operational amplifier U51B is connected with the output end of the fifth emitter follower circuit 28, the control signal extracted from detecting and filtering circuits is loaded to the input end of control logic generation circuit 33; the control logic generation circuit 33 is connected in series and lapped by NAND gate U52A and NAND gate U52B, two opposite trigger signals are formed to be respectively loaded on trigger ends of electronic switch U54A and electronic switch U54B; the noise suppression signal is sent to operational amplifier U53A via electronic switch U54A for output.

The circuit structure of controlled attenuator circuit 51 includes resistor R18, field-effect transistor Q11, and resistor R110 connected with field-effect transistor Q11 in parallel, which is successively connected with control end of detection noise comparison amplifying circuit 50. The output end of field-effect transistor Q11 is connected with input end of first emitter follower circuit 52. The first emitter follower circuit 52 is the amplifier U11D.

The nominal level amplifying circuit 49 is the operational amplifying circuit lapped by operational amplifier U11B and matched resistor R12 and resistor R13.

Figure 3:
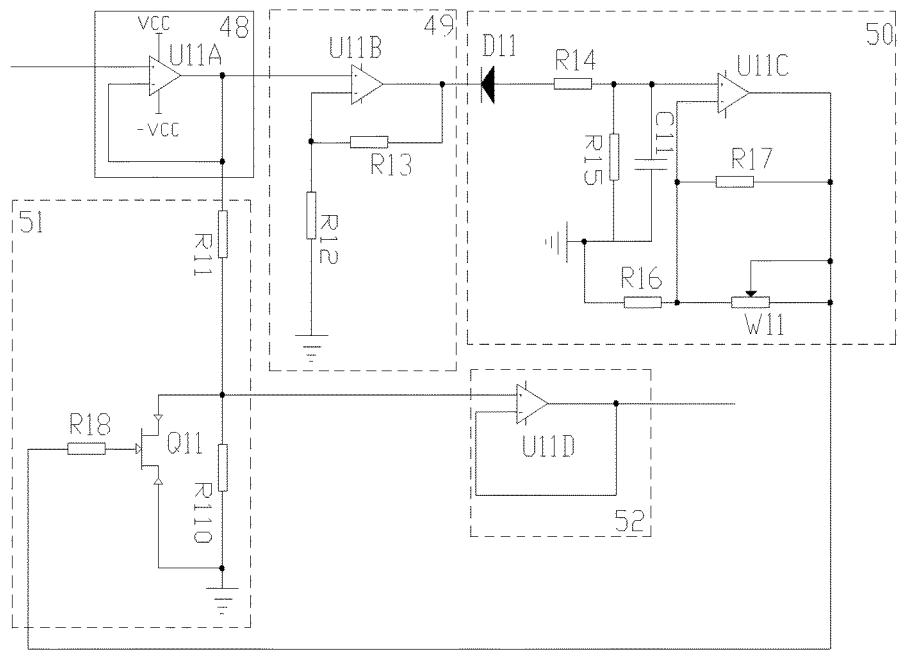
FIG. 3 is the electrical schematic diagram of FIG. 2.

The circuit structure of detection noise comparison amplifying circuit 50 includes the detecting circuit comprised by diode D11, voltage division and filter circuits comprised by operational amplifier U11C, resistor R14, resistor R15, and capacitor C11, and the negative feedback DC amplifying circuit lapped by adjustable voltage division circuit comprised by resistor R16, resistor R17, and adjustable resistor W11. In specific embodiments, as shown in FIG. 3, U11A is the input end emitter follower circuit 48, its output passes through the resistance attenuator comprised by R11 and R110, which is output to the next level through emitter follower comprised by amplifier U11D. The field-effect transistor Q11 is connected in parallel with R110, its resistance variation can change R11 and attenuation of R110 resistance attenuator. The resistance variation of field-effect transistor Q11 is controlled by operational amplifier U11C. The amplification amount of operational amplifier U11B set the nominal amplitude for attenuation to input signal.

In specific embodiments, in consideration of the application of this method in China, the frequency scope of power line carrier channel regulated by China is: from 40 khz to 500 khz Therefore, any suppression strong interference noise circuit designed by this method shall normally work within this frequency band. For any mixed signal with difference of 50 dB, it is based on suppression of strong interference signal, however, the weak signal can't be compressed and attenuated. The design difficulty can be imagined to distinguish or screen out the weak carrier signal from noise inundation with amplitude of 50 dB by "simulative" or "digital" processing technology. This patent first starts from distinguishing, recognizing, and suppressing the strong interference noise signal, although the weak carrier signal can't be caught, however the carrier (sub-carrier) absolutely won't be weakened or compressed. When the strong noise interference is suppressed to certain level, the carrier signal will be extracted for effective amplification, thereby improving the signal to noise ratio of transmission carrier (sub-carrier) signal in channel. Because the mutual positions of strong interference noise and weak carrier (sub-carrier) signals change with information coding rules at any moment in the whole carrier channel from 40 khz to 500 khz, the mutual positions of strong interference noise and carrier frequency in channel are needed to be recognized at any moment in the process of suppressing strong interference, which can only be realized through distinguishing strong interference noise and amplitude variation passing specific circuit under the situation of unmeasured carrier signal.

Figure 5:
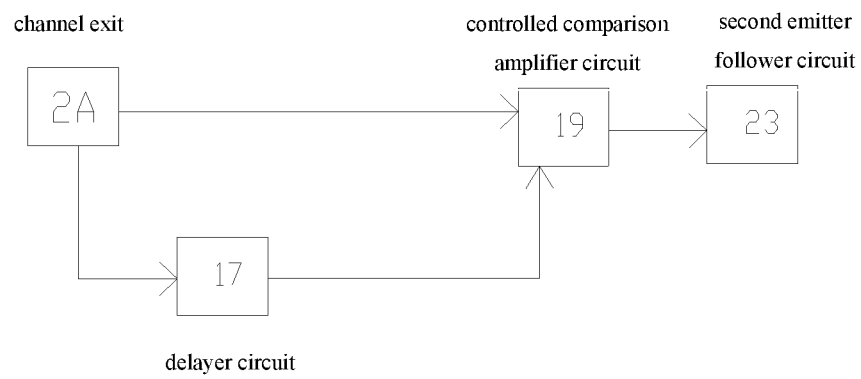
FIG. 5 is the structure schematic diagram of first suppression circuit, of which the frequency of strong interference noise signal is lower than the frequency of carrier signal.

First, when the strong interference noise (pulse interval) frequency is lower than carrier (sub-carrier), that is to say the weak high-frequency sine wave is superposed on sine wave of which the amplitude is about 50 dB higher and the frequency is relatively lower. The basic knowledge of electronic circuit informs us that when two sine waves with different frequencies transmitted in the same channel are delayed for certain time t at the same time (T/4<t<3T/4, of which T is the period of sine wave with higher frequency), the change rules of their phases are: the corresponding phase change of fixed delay is bigger with frequency rise. If we input these two sine waves before and after the delay into a differential amplifier for amplification again, the output amplitude will become large from small with rise the sine wave frequency, an obtain the amplitude gain of 6 dB at the delay point of t=T/2. The principle block diagram is as shown in FIG. 5.

However, this method can only suppress the strong interference noise of which the frequency is lower than carrier. When the strong interference noise is higher than carrier (sub-carrier), the strong interference noise can not only be suppressed but also be enhanced on the contrary. Due to enhanced interference noise output at the moment, we can utilize this characteristic to accurately distinguish the frequency range of interference and carrier frequencies in carrier channel in the premise of not predicting them.

Second, if the frequency of strong interference noise (pulse interval) is higher than the frequency of carrier (sub-carrier), which is equivalent to the superposition of weak low-frequency sine wave on sine wave with higher amplitude of about 30 dB and relatively high frequency. The mixed waveform is similar to amplitude modulated wave. The design of this suppression method is to make the mixed signal pass through the amplitude limiter, suppressing the weak sine wave signal superposed on top of strong sine wave. We can obtain the mixed signal of weak signal at amplitude peak through differential amplification of this signal with compressed or eliminated top and original signal. We shall notice that the amplitude limit can't be too large, it's better to use multi-level connection for classified amplitude limiting. The processed mixed signal can be amplified in the process of cascade connection to obtain the gains of weak signal. During the cascade connection, the mixed signal amplitude recognition circuit is also needed to ensure that only limiting amplitude of mixed signal exceeding the setting amplitude, the mixed signal lower than the setting amplitude will be directly transmitted to next level.

Figure 7:
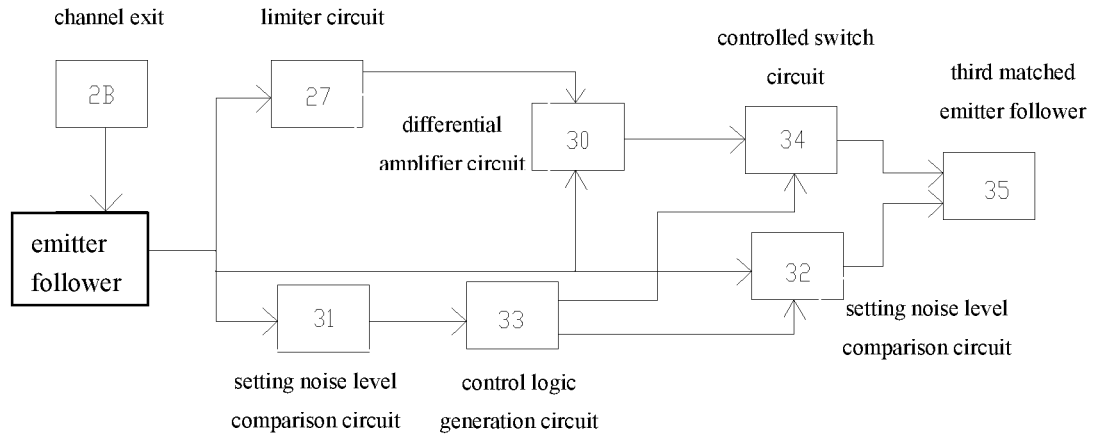
FIG. 7 is the structure schematic diagram of second suppression circuit, of which the frequency of strong interference noise signal is higher than the frequency of carrier signal.

Its principle block diagram is as shown in FIG. 7. Due to the envelope information on strong interference noise amplitude change in mixed signal carries weak low-frequency signal. The substance of this method is to use the lost information of partial strong signal and tolerable distortion of weak signal as the price to amplify and extract weak signal. However, this suppression method is congenitally deficient, when the frequency of high-frequency strong interference is less than double weak signal frequency, the ability on extracting weak signal will be bad.

In conclusion, when the strong interference and carrier (sub-carrier) signal changes frequencies in the whole carrier channel according to coding rule, the above two methods can't independently complete tasks of suppression of strong interference noise and enhancement of carrier signal. However, the noises in power line carrier channel of circuit suppression designed by these two methods have strong points. Therefore, the key of this invention is to randomly and accurately distinguish and recognize the scope of strong interference noise and carrier (sub-carrier) frequency in carrier channel. According to the situation of frequency lead of strong interference noise or lagging carrier, the pending signals are respectively transmitted to above circuits designed by two suppression methods through the time-sharing processing channel module 2. Regardless of any position of strong interference noise and carrier (sub-carrier) in channel, the suppression of strong interference noise of power line can be realized with the method demonstrated by this patent. There are various methods for distinguishing the scope of strong interference noise and carrier frequency. The designed circuit as shown in FIG. 6 is also the simple and direct method for recognizing and distinguishing the relative position of strong interference and carrier (sub-carrier) in carrier channel. The corresponding electronic switch is started with control pulse formed by its output, transmitting the pending interfered carrier (sub-carrier) signal to corresponding noise suppression circuit for processing.

The characteristics of first suppression circuit 3 of which the strong interference noise signal frequency is lower than carrier signal frequency, the second suppression circuit 5 of which the strong interference noise signal frequency is higher than carrier signal frequency, and the time-sharing processing channel module 2 designed in circuit structure of this method are: the system can accurately distinguish frequencies of strong interference noise and carrier (sub-carrier) no matter how they change randomly in power line carrier channel, which transmits the carrier (sub-carrier) signal damaged by strong interference noise to corresponding processing circuit for suppression through control circuit. The common characteristics of these suppression circuits are: in the major premise of whole carrier frequency band not being suppressed, the weak carrier (sub-carrier) signal can effectively attenuate the strong interference noise.

We claim:

1. A suppression method for strong interference noise of power line carrier channel, which is based on processing carrier signals transmitted in a standardized frequency interval within a power line transmission regional network, comprising:
   A. providing a carrier signal extracted from a receiving point into a high-pass filter (GH), eliminating an interference signal within a lower limit of frequency interval mixed in the carrier signal, so as to obtain a mixed signal having a frequency higher than the lower limit of frequency interval, which comprises a strong interference noise signal and the carrier signal;
   B. amplitude limiting the mixed signal through a nominal level amplitude limiting circuit (1), so as to obtain a mixed amplitude limiting signal within a nominal level range;
   C. introducing the mixed amplitude limiting signal into a time-sharing processing channel module (2), which comprises a comparison circuit (8) for comparing a frequency of the strong interference noise signal and a frequency of the carrier signal, and two information channel modules determined based on a logic value of the comparison circuit, wherein the two information modules include: a first information channel module (2A), selected when the frequency of the strong interference noise signal is lower than the frequency of the carrier signal, and a second information channel module (2B), selected when the frequency of the strong interference noise signal is higher than the frequency of the carrier signal, thereby entering into time-sharing processing;
   D. introducing the mixed signal, when the frequency of the strong interference noise signal is lower than the frequency of the carrier signal, into a first suppression circuit (3) for processing of amplitude limiting and noise reduction to get a mixed signal A after noise suppression, which is then transmitted to a differential mixer circuit (4);
   E. introducing the mixed signal, when the frequency of the strong interference noise signal is higher than the frequency of the carrier signal, into a second suppression circuit (5) to obtain a mixed signal B after noise suppression, which is then transmitted to the differential mixer circuit (4);
   F. generating a differentially mixed signal by differential mixing of the mixed signal A and the mixed signal B through the differential mixer circuit (4); and
   G. outputting the differentially mixed signal.

2. The method according to claim 1, wherein the first suppression circuit (3) comprises a delayer circuit (17), a controlled comparison amplifier circuit (19), an emitter follower circuit (23), comprising:
   sending the mixed signal from the first information channel module (2A) to a delayer circuit (17) to produce a delayed mixed signal;
   sending the mixed signal from the first information channel module (2A) to a first input of the controlled comparison amplifier circuit (19);
   sending the delayed mixed signal produced by delayer circuit (17) to a second input of the controlled comparison amplifier circuit (19);
   providing a differential amplified mixed signal at an output of the controlled comparison amplifier circuit (19); and
   processing the amplified mixed signal via the emitter follower circuit (23).

3. The method according to claim 1, wherein the time-sharing processing channel module (2) further comprises an amplifier directly connected to the comparison circuit to form a noise frequency discrimination circuit (J) and a noise level extraction circuit (10), further comprising;
   providing the mixed amplitude limiting signal output by the amplitude limiting circuit to an input of the noise frequency discrimination circuit (J) and to an input of the noise level extraction circuit (10);
   generating a first trigger signal using a first level switching circuit (9) based on an output of the first frequency discrimination circuit (J);
   generating a second trigger signal using a second level switching circuit (11) based on an output of the noise level extraction circuit (10);
   generating a third trigger signal using a non-gate circuit (12) based on an output of the first level switching circuit (9);
   sending the first third trigger signal to a second electronic switch (14);
   sending the second trigger signal to a first electronic switch (13); and
   sending the third trigger signal to a third electronic switch (15),
   wherein noise extraction circuit (10), the second level switching circuit (11), the first level switching circuit (9), the first electronic switch (13) and the second electronic switch (14) formed the first channel information module (2A) and, wherein the non-gate circuit (12) and, the third electronic switch (15) formed the second channel information module (2B).

4. The method according to claim 1, wherein the first suppression circuit (3) comprises a delayer circuit (17), a controlled comparison amplifier circuit (19), an emitter follower circuit (23), and a control signal extraction circuit (16), further comprising:

sending the mixed signal from the first information channel module (2A) to a delayer circuit (17) to produce a delayed mixed signal;

sending the mixed signal from the first information channel module (2A) to an input of the control signal extraction circuit (16);

sending the delayed mixed signal produced by delayer circuit (17) to a first input of the controlled comparison amplifier circuit (19);

sending a control signal from the control signal extraction circuit (16) to a control signal input end of an amplification factor control circuit in the controlled comparison amplifier circuit (19);

generating an amplified mixed signal at an output of the controlled comparison amplifier circuit (19) and;

providing the amplified mixed signal to the emitter follower circuit (23).

* * * * *